US008451266B2

(12) United States Patent
Hertenstein

(10) Patent No.: US 8,451,266 B2
(45) Date of Patent: May 28, 2013

(54) INTERACTIVE THREE-DIMENSIONAL AUGMENTED REALITIES FROM ITEM MARKERS FOR ON-DEMAND ITEM VISUALIZATION

(75) Inventor: David Hertenstein, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 12/632,537

(22) Filed: Dec. 7, 2009

(65) Prior Publication Data

US 2011/0134108 A1   Jun. 9, 2011

(51) Int. Cl.
*G06T 15/00* (2011.01)

(52) U.S. Cl.
USPC ........... 345/419; 345/629; 345/630; 382/232; 705/26.2; 705/27.1; 715/782

(58) Field of Classification Search
USPC . 345/419, 629, 630; 705/26.2, 27.1; 715/782; 382/232
See application file for complete search history.

(56) References Cited

U.S. PATENT DOCUMENTS

| | | | |
|---|---|---|---|
| 7,523,411 B2 * | 4/2009 | Carlin | 715/782 |
| 7,542,925 B2 * | 6/2009 | Tung | 705/26.2 |
| 7,848,578 B2 * | 12/2010 | Suomela et al. | 382/232 |
| 8,065,201 B2 * | 11/2011 | Perkowski | 705/27.1 |
| 8,069,088 B1 * | 11/2011 | Foulser et al. | 705/26.1 |
| 8,261,972 B2 * | 9/2012 | Ziegler | 235/375 |
| 8,271,346 B1 * | 9/2012 | Smith | 705/26.1 |
| 2002/0094189 A1 | 7/2002 | Navab et al. | |
| 2005/0289590 A1 | 12/2005 | Cheok et al. | |
| 2007/0242886 A1 | 10/2007 | St. John | |

OTHER PUBLICATIONS

Wagner, D., et al., "ARToolKitPlus for Pose Tracking on Mobile Devices" [online] Proceedings of 12th Computer Vision Winter Workshop (CVWW'07) Feb. 2007, [retrieved Dec. 7, 2009] retrieved from the Internet: <http://www.icg.tu-graz.ac.at/Members/daniel/Publications/ARToolKitPlus>.
Kato, H., et al., "Marker Tracking and HMD Calibration for a Video-based Augmented Reality Conferencing System" in Proceedings of the 2nd International Workshop on Augmented Reality (IWAR 99). Oct. 1999, [retrieved Dec. 7, 2009] retrieved from the Internet: <http://www.hitl.washington.edu/artoolkit/Papers/IWAR99.kato.pdf>.

(Continued)

*Primary Examiner* — Phu K Nguyen
(74) *Attorney, Agent, or Firm* — Patents on Demand P.A.; Brian K. Buchheit; Scott M. Garrett

(57) ABSTRACT

A system that provides interactive three-dimensional (3D) augmented realities can include an augmented reality item marker (ARIM), a network-enabled mobile computing device, an augmented reality item lookup service (ARILS), and an augmented reality item viewer (ARIV). The ARIM can be a two-dimensional graphic conforming to a standardized encoding specification that can encode data elements about a product item. The network-enabled mobile computing device can include a camera configured to digitally capture the ARIM. The ARILS can be configured to provide a data response that includes augmented reality item data to the network-enabled mobile computing device. The ARIV can be configured to present an interactive 3D augmented reality visualization of the product item utilizing the augmented reality item data provided by the ARILS. A presented view of the interactive 3D augmented reality visualization can be automatically and dynamically changed to reflect planar position changes of the network-enabled mobile computing device.

20 Claims, 4 Drawing Sheets

OTHER PUBLICATIONS

Moehring, M., et al., "Video See-Through AR on Consumer Cell-Phones" [online] Mixed and Augmented Reality, 2004 ISMAR 2004, 3rd IEEE and ACM International Symposium, pp. 252-253, [retrieved Dec. 7, 2009] retrieved from the Internet: <http://www.uni-weimar.de/medien/ar/Pub/Cell_Phone_AR.pdf>.

* cited by examiner

INTERACTIVE THREE-DIMENSIONAL AUGMENTED REALITIES FROM ITEM MARKERS FOR ON-DEMAND ITEM VISUALIZATION

BACKGROUND

The present invention relates to the field of augmented reality and, more particularly, to interactive three-dimensional (3D) augmented realities from item markers for on-demand product visualization.

Product item promotions and/or advertisements rely heavily upon the use of graphical media to present a product item to consumers. Printed graphical media, such as magazine ads and posters, are limited to using two-dimensional (2D) images of the product item and textual descriptions. While these types of product item presentations suffice for many product items, there are other product items, such as furniture or appliances, that consumers would benefit more from having a 3D representation. For example, a consumer standing in their home is unable to fully realize the dimensions of a coffee maker and how the coffee maker would sit on the counter from a 2D magazine advertisement.

In an attempt to address this issue, a product promotion/advertisement will often include multiple static images of the product item from various angles. While this approach is helpful, a consumer is still limited to viewing the product item at only those angles. Even video presentations (i.e., commercials, animations, etc.) are nothing more than a series of 2D images. While three-dimensional objects are portrayed better in video presentations, the consumer is typically not afforded any interactive aspect in which to manipulate the product item to view it from a desired angle.

The use of a 3D interactive model or an augmented reality model of a product item is typically reserved for use in special presentations such as trade shows due to cost and presentation requirements; such models are often created as self-contained presentation kiosks. This current implementation of 3D interactive and/or augmented reality product item models does not provide the same level of portability or flexibility as conventional graphical media.

To provide additional information, some graphical media include data-dense markings, such as a QUICK RESPONSE (QR) matrix code. Such a data-dense marking stores textual information that is captured by the camera component of a mobile device, then decoded and processed by a corresponding reader application. For example, a user can capture a marking from an advertisement in a magazine with their Web-enabled cell phone and the reader application can automatically launch a Web browser to display the product's Web page.

BRIEF SUMMARY

One aspect of the present invention can include a system that provides interactive three-dimensional (3D) augmented realities. Such a system can include an augmented reality item marker (ARIM), a network-enabled mobile computing device, an augmented reality item lookup service (ARILS), and an augmented reality item viewer (ARIV). The ARIM can be coupled with a user-accessible surface of graphical media for a product item and configured to encode data elements specific to the product item. The ARIM can be a two-dimensional graphic that conforms to a standardized encoding specification. The network-enabled mobile computing device can include a camera component and can be configured to digitally capture an image of the ARIM. The ARILS can be configured to provide a data response that includes augmented reality item data to the network-enabled mobile computing device in response to a data request. The data request can include the data elements from the ARIM and a unique identifier for the network-enabled mobile computing device. The ARIV can be configured to utilize the augmented reality item data provided by the ARILS to present an interactive 3D augmented reality visualization of the product item upon the network-enabled mobile computing device. A presented view of the interactive 3D augmented reality visualization can automatically and dynamically change to reflect a change in the planar positioning of the network-enabled mobile computing device.

Another aspect of the present invention can include a method for providing interactive three-dimensional (3D) augmented realities. The digital image of an augmented reality item marker (ARIM) for a product item can be captured by an augmented reality item viewer (ARIV) running on a network-enabled mobile computing device using the camera component of the network-enabled mobile computing device. Data elements can then be decoded from the captured ARIM. Augmented reality item data that matches the decoded data elements can be requested from an augmented reality item lookup service (ARILS). In response to receiving the augmented reality item data from the ARILS, an interactive 3D augmented reality visualization of the product item can be rendered upon the network-enabled mobile computing device in real-time or near real-time.

Yet another aspect of the present invention can include a computer program product that includes a computer-readable storage medium having embedded computer usable program code. The computer-usable program code can be configured to capture the digital image of an augmented reality item marker (ARIM) for a product item utilizing a camera component of a network-enabled mobile computing device. The computer-usable program code can then be configured to decode data elements from the captured ARIM. The computer-usable program code can be configured to request augmented reality item data from an augmented reality item lookup service (ARILS) that matches the decoded data elements. In response to receiving the augmented reality item data from the ARILS, the computer-usable program code can be configured to render an interactive 3D augmented reality visualization of the product item upon the network-enabled mobile computing device in real-time or near real-time.

DETAILED DESCRIPTION

Figure 1:
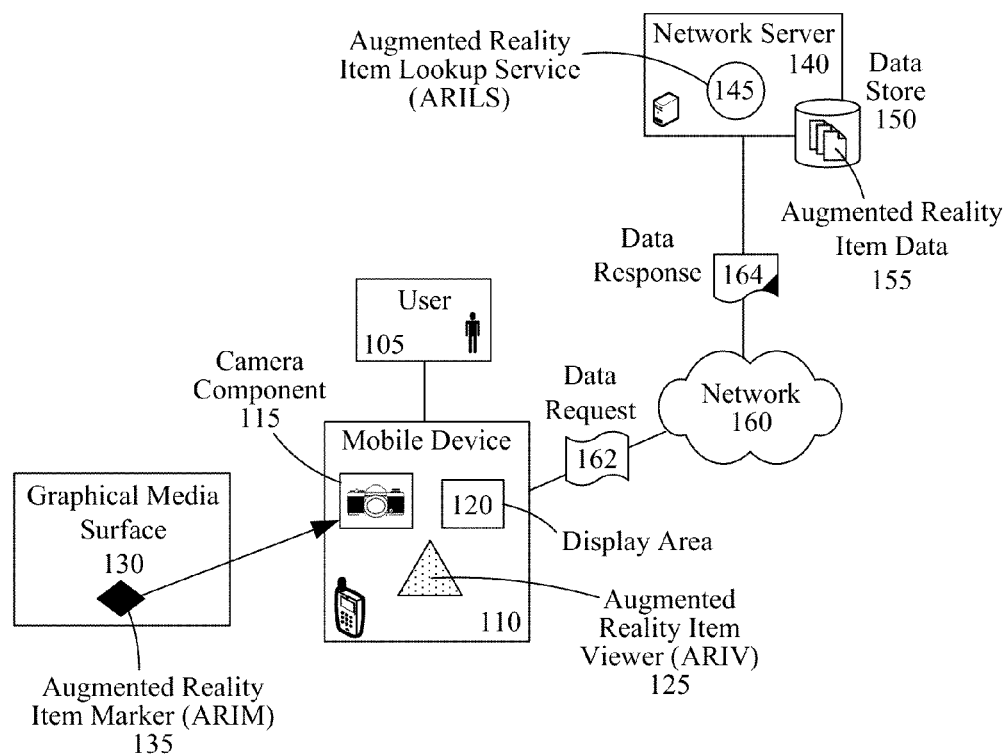
FIG. 1 is a schematic diagram illustrating a system that provides interactive three-dimensional (3D) augmented realities from augmented reality item markers (ARIMs) for on-demand product visualization in accordance with embodiments of the inventive arrangements disclosed herein.

The present invention discloses a system that can provide interactive three-dimensional (3D) augmented realities from item markers for on-demand product visualization. Information about a product item can be encoded within a visual an augmented reality item marker (ARIM). A network-enabled mobile computing device having a camera component and running an augmented reality item viewer (ARIV) can capture and decode the ARIM. The decoded data can then be conveyed to an augmented reality item lookup service (ARILS) to provide the ARIV with augmented reality item data. With the augmented reality item data, the ARIV can create an interactive 3D augmented reality visualization in real or near real-time.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction processing system. For the purposes of this description, a computer-usable or computer-readable medium can be any apparatus that can contain, store, communicate, propagate, or transport the program for use by or in connection with the instruction processing system, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, RF, etc.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD. Other computer-readable medium can include a transmission media, such as those supporting the Internet, an intranet, or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or processing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during runtime.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a implemented process such that the instructions which run on the computer or other programmable apparatus provide steps for implementing the functions/acts specified in the flowchart and/or block diagram block or blocks.

FIG. 1 is a schematic diagram illustrating a system 100 that provides interactive three-dimensional (3D) augmented realities from augmented reality item markers (ARIMs) 135 for on-demand product visualization in accordance with embodiments of the inventive arrangements disclosed herein. In system 100, an augmented reality item lookup service (ARILS) 145 can provide an augmented reality item viewer (ARIV) 125 with augmented reality item data 155 to create an interactive 3D augmented reality visualization of a product item depicted on a graphical media surface 130 having an ARIM 135.

The user 105 can encounter a graphical media surface 130 that includes an ARIM 135. The graphical media surface 130 can represent a variety of visual media, including, but not limited to, a printed advertisement, a video display, a poster, a flyer, a product display board, and the like. It is important to note that the graphical media surface 130 must be accessible by the user 105 (i.e., unobstructed) and can be either portable such as a paper flyer or permanent/semi-permanent such as an in-store display board.

The ARIM 135 can represent a two-dimensional graphic capable of encoding data. The ARIM 135 can conform to a standardized encoding specification, such as the QUICK RESPONSE (QR) matrix code. The information encoded within the ARIM 135 can be specifically related to the product item featured on the graphical media surface 130. For example, an ARIM 135 included on the graphical media surface 130 for an automobile would encode data that relates to that specific automobile.

It should be noted that, in the case where the graphical media surface 130 presents moving imagery, such as a television commercial, the ARIM 135 can be presented as a static overlay to the moving imagery or video.

The ARIV 125 can be a software application configured to decode ARIMs 135 and render an interactive 3D augmented reality visualization of the corresponding product item. The ARIV 125 can be capable of running on a network-enabled mobile device 110 and communicating with the ARILS 145 over a network 160. For example, the ARIV 125 can be a FLASH-based application that utilizes a 3D rendering engine such as PAPERVISION3D.

The mobile device 110 can represent a variety of computing devices that have camera components 115 and display areas 125, including, but not limited to, a smart phone, a mobile phone, a laptop computer, a portable multi-media player, a portable game console, and the like.

The ARIV 125 can utilize the camera component 115 of the mobile device 110 to capture an image of the ARIM 135. The data contained in the ARIM 135 can then be decoded and can be used to create a data request 162. The data request 162 can be conveyed to the ARILS 145 over the network 160.

The ARILS 145 can represent a network service that fulfills received data requests 162 with the appropriate augmented reality item data 155 from the data store 150. The ARILS 145 can operate on a network server 140 that the mobile device 110 can access over the network 160.

Upon receipt of the data request 162, the ARILS 145 can retrieve the corresponding augmented reality item data 155 from the data store 150. The augmented reality item data 155 can include a variety of information about the product item, such as 3D model data, a model number of the product item, manufacturer information, a Web address, a textual description, dimensions of the product item, and the like. The augmented reality item data 155 can be packaged in a data response 164 and sent back to the mobile device 110 and ARIV 125.

The data request 162 and data response 164 can be configured to utilize a standardized electronic encoding format, such as the extensible markup language (XML). As such, these messages 162 and 164 can encapsulate the exchanged data in a lightweight and structured manner. For example, each element of data included in the data request can be wrapped in an easily-identified set of XML tags.

The ARIV 125 can then use the received augmented reality item data 155 to render the interactive 3D augmented reality visualization for the product item displayed on the graphical media surface 130 in the display area 120 of the mobile device 110. The user 105 can then interact with the interactive 3D augmented reality visualization through a variety of device-supported mechanisms, such as touch screen movements or repositioning of the mobile device 110.

For example, the ARIV 125 can detect when the user 105 has rotated the mobile device 110 and can adjust the displayed product visualization to match the rotation. That is, a rotation of the mobile device 110 by 90° clockwise can result in the product visualization also being rotated 90° clockwise.

In another embodiment, the functionality of the ARIV 125 can be expanded to utilize listener components (not shown) that can detect the occurrence of device or script events upon the mobile device 110. Triggering of a listener can cause automatic changes to the displayed product visualization. It should be noted that the changes to the product visualization in such an embodiment are not directly initiated by the user. That is, the change to the product visualization can occur without direct user directly interaction.

In yet another embodiment, the interface of the ARIV 125 displaying the product visualization can include one or more user-interactive objects (not shown), such as buttons, sliders, switches, and/or other compatible 3D interface widgets. User 105 modification to an interactive object (i.e., flipping a switch) can load new data within the product visualization.

For example, a streaming video of a salesperson can be directly presented within display area 120 accompanying the product visualization or even overlaid upon the product visualization in response to the push of a button within the ARIV 125. The content of the streaming video presentation can even be modified based on information about the mobile device 110 like location or user 105.

It is important to emphasize that conventional attempts at incorporating augmented reality into product marketing relies upon Web browser-compliant technology to render the interactive 3D augmented reality visualization. The matrix manipulations and conversions to a two dimensional renderable view all occurred at a Web server, which converted the object to a standard two-dimensional renderable Web page. As such, changes to the presented view of the product visualization is performed by the Web server and sent to the mobile device 110. This approach can require substantial bandwidth and a stable network connection to handle the high volume of data, which are not always available to smaller mobile devices 110.

Further, in one embodiment of the disclosure, the 3D model data for the product item can be premade and stored by the ARILS 145. Thus, once conveyed to the mobile device 110, changes to the presented view of the product visualization can be performed entirely by the ARIV 125. Thus, a local component or viewer 125 on the mobile device controls the user perceived view of the object. Matrix manipulations of the 3D model are performed locally by the viewer 125. One advantage of this approach is that it requires only one data exchange between the mobile device 110 and ARILS 145. The user 105 can continue interacting with the product visualization without additional consideration of connectivity and bandwidth. This solution decreases load on an external server (e.g., a Web server) which makes the solution much more scalable than traditional systems. Further, once 3D model data is acquired, it can be locally stored on the mobile device 115 and used in the future.

In another contemplated embodiment, a local server (e.g., a server of a merchant, for example) can cache 3D models that are often requested by mobile devices 110, which can also help tier the load placed upon network server 140, should it be necessary. For example, a storefront intermediate server (or a "mall level server", a city level server, etc.) can be used to initially intercept and handle requests 162. That is, data requests 162 can be optionally handled by localized intermediate servers (not shown) having a localized version of the ARILS system, where the intermediate server only needs to convey exchanges to network server 140, which it cannot handle locally. This simply means that the system 100 and solution involving viewer 125 is much more scalable and potentially responsive than traditional implementations, which are dependent upon remote graphical manipulations (which can be processor and bandwidth intensive—and which do not scale well in many instances).

Network 160 can include any hardware/software/and firmware necessary to convey data encoded within carrier waves. Data can be contained within analog or digital signals and conveyed though data or voice channels. Network 160 can include local components and data pathways necessary for communications to be exchanged among computing device components and between integrated device components and peripheral devices. Network 160 can also include network equipment, such as routers, data lines, hubs, and intermediary servers which together form a data network, such as the Internet. Network 160 can also include circuit-based communication components and mobile communication components, such as telephony switches, modems, cellular communication towers, and the like. Network 160 can include line based and/or wireless communication pathways.

As used herein, presented data store 150 can be a physical or virtual storage space configured to store digital information. Data store 150 can be physically implemented within any type of hardware including, but not limited to, a magnetic disk, an optical disk, a semiconductor memory, a digitally encoded plastic memory, a holographic memory, or any other recording medium. Data store 150 can be a stand-alone storage unit as well as a storage unit formed from a plurality of physical devices. Additionally, information can be stored within data store 150 in a variety of manners. For example, information can be stored within a database structure or can be stored within one or more files of a file storage system, where each file may or may not be indexed for information searching purposes. Further, data store 150 can utilize one or more encryption mechanisms to protect stored information from unauthorized access.

Each of the computing devices 115, 140 shown can include hardware and computer program product components. The hardware can include a processor, a volatile memory, a non-volatile memory, and/or other such components can be communicatively linked via a bus. The computer program products can be digitally encoded on the volatile and/or the non-volatile memory and can include a set of instructions, which the processor is able to run. In one embodiment, at least a portion of the computer program products can include native products specifically designed and paired for hardware. In one embodiment, at least a portion of the computer program products can include an operating system and a set of applications and computer program products designed for that operating system.

The operating system of the mobile device 110 can be a stream-lined or compact one designed for resource constrained devices. For example, the mobile device 110 can include GOS, POCKET LINUX, PALM OS, WINDOWS COMPACT EDITION, and any of a variety of other operating systems specifically designed for compact or embedded devices. The mobile device 110 is not limited to use of a compact OS and in another embodiment device 110 can be an ultra-mobile device, a netbook, or device with sufficient internal resources to host a desktop operating system made for personal computers. Server 140 can include a server based operating system or a desktop operating system.

Figure 2:
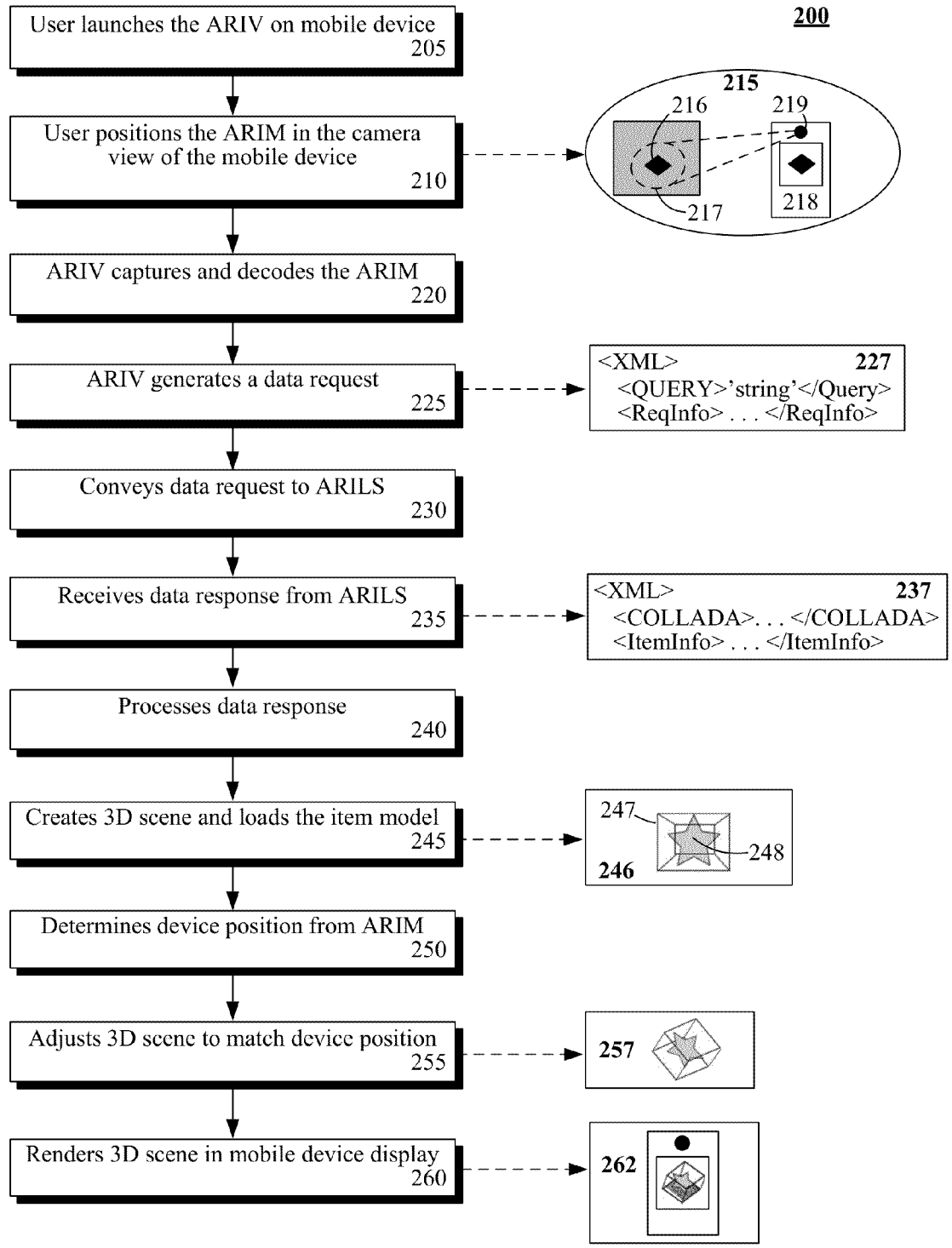
FIG. 2 is an illustrated flow chart of a method detailing the rendering of an interactive 3D augmented reality by an augmented reality item viewer (ARIV) from an augmented reality item marker (ARIM) in accordance with an embodiment of the inventive arrangements disclosed herein.

FIG. 2 is an illustrated flow chart of a method 200 detailing the rendering of an interactive 3D augmented reality by an augmented reality item viewer (ARIV) from an augmented reality item marker (ARIM) in accordance with embodiments of the inventive arrangements disclosed herein. Method 200 can be performed within the context of system 100 or any other system supporting the rendering of interactive 3D augmented realities from ARIMs.

Method 200 can begin in step 205 where a user can launch the ARIV on the mobile device. In step 210 and illustrated in example 215, the user can position the mobile device 218 such that the ARIM 216 is within the viewing area 217 of the camera component 219. The ARIV can capture and decode the ARIM 216 in step 220.

The ARIV can generate a data request such as that shown in example 227 in step 225. In step 230, the data request can be conveyed to the ARILS. A data response, shown in example 237, can be received from the ARILS in step 235.

In step 240, the ARIV can process (e.g., separate the elements of) the data response. The 3D scene can be created and the item model loaded in step 245. As shown in example 246, the cube 247 represents the 3D scene and the star 248 represents the item model displayed within the 3D scene 247.

The position of the mobile device can be determined in step 250. In step 255, the 3D scene can be adjusted to match the device position. As shown in example 257, the cube representing the 3D scene, and, subsequently, the item model (the star) has been realigned to match the orientation of the mobile device to the captured ARIM.

In step 260 and illustrated in example 262, the adjusted 3D scene can then be rendered within the display of the mobile device.

Figure 3:
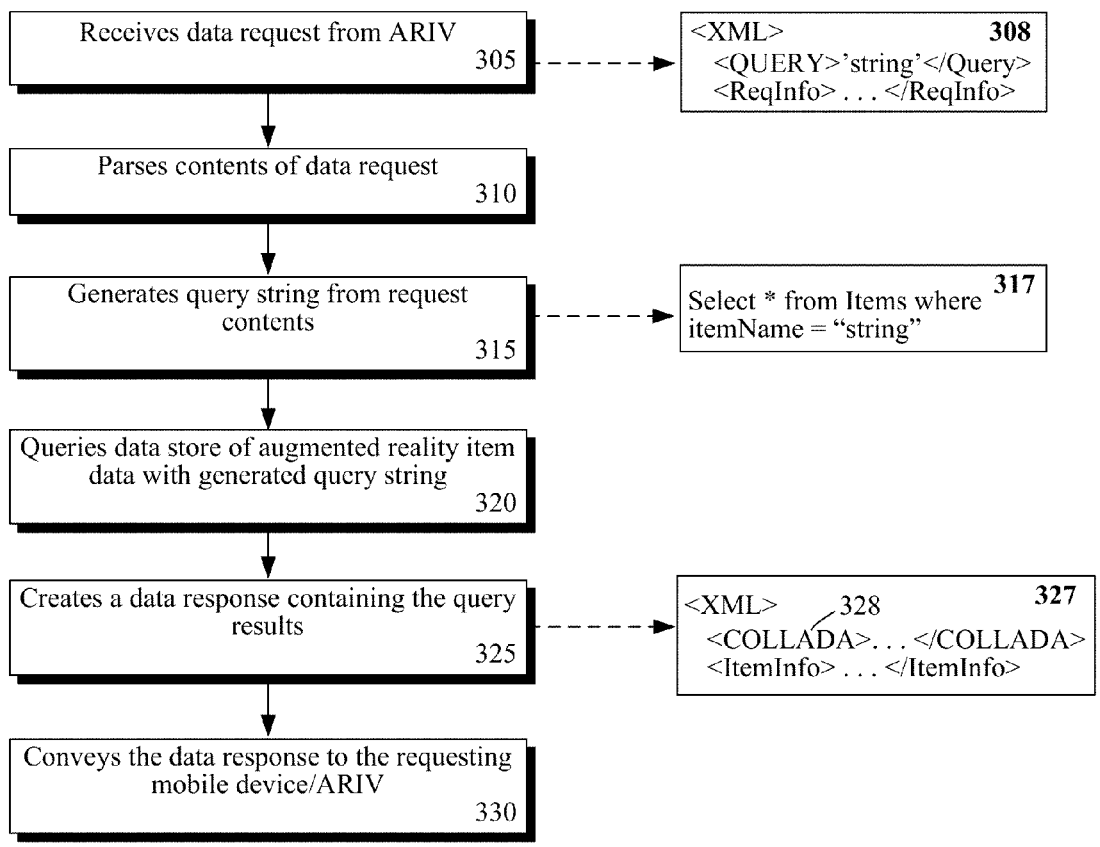
FIG. 3 is an illustrated flow chart of a method detailing the retrieval of augmented reality item data by an augmented reality item lookup service (ARILS) in accordance with an embodiment of the inventive arrangements disclosed herein.

FIG. 3 is an illustrated flow chart of a method 300 detailing the retrieval of augmented reality item data by an augmented reality item lookup service (ARILS) in accordance with embodiments of the inventive arrangements disclosed herein. Method 300 can be performed within the context of system 100 and/or in conjunction with method 200.

Method 300 can begin in step 305 where the ARILS can receive the data request from the ARIV, such as that shown in example 308. The contents of the data request can be parsed in step 310. In step 315, a query string can be generated from the parsed contents, as shown by the sample structured query language (SQL) string in example 317.

A data store of augmented reality item data can be queried with the generated query string in step 320. In step 325, a data response that includes the query results can be created. A sample data response can be viewed in example 327.

In example 327, the 3D modeling data can be represented by the COLLADA tag 328. Utilizing the COLLADA format can promote interchangeability of the 3D modeling data between interactive 3D applications. Further, COLLADA can assist in minimizing the bandwidth required to convey the 3D model, since COLLADA files are represented in XML.

In step 330, the data response can be conveyed to the requesting mobile device/ARIV.

Figure 4:
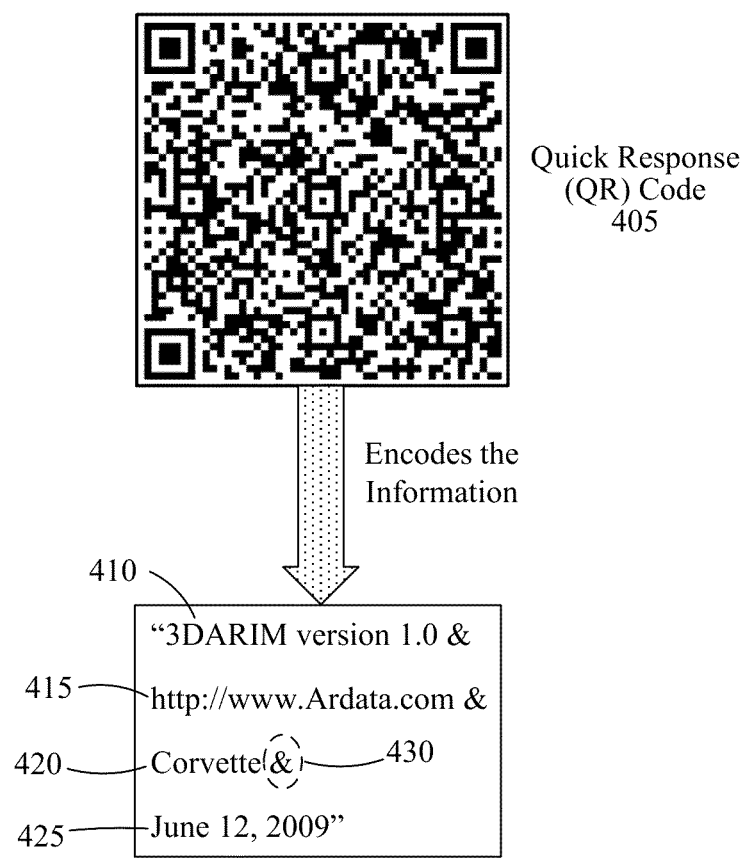
FIG. 4 is an illustration of an example augmented reality item marker (ARIM) in accordance with embodiments of the inventive arrangements disclosed herein.

FIG. 4 is an illustration of an example augmented reality item marker (ARIM) 400 in accordance with an embodiment of the inventive arrangements disclosed herein. The example ARIM 400 can be utilized within the context of system 100 and/or method 200.

The example ARIM 400 can utilize a QUICK RESPONSE (QR) code 405. It should be noted that QR codes 405 are of an open-source standard and are widely used to convey textual information, similar to bar codes, but with a higher degree of data-density.

In this example 400, the QR code 405 can encode a variety of information 410-425. As shown, this QR code 405 can encode versioning information 410, the uniform resource locator (URL) for the corresponding augmented reality item lookup service (ARILS) 415, a keyword or query string information 420, and a publish date 425.

The versioning information 410 can define the specification version used to create the QR code 405. This can indicate to the augmented reality item viewer (ARIV) how to decode the information.

The ARILS URL 415 can indicate the network address of the service to contact to receive the augmented reality item data. The ARILS URL 415 can be expanded to include additional information, such as scripting parameters and usernames (i.e., values/parameters typically incorporated into URLs).

The query string information 420 can contain textual data that can tell the ARIV and/or ARILS how to construct the query to retrieve the augmented reality item data for this product item.

The publish date 425 can be used by the ARIV and/or ARILS to determine the validity of the QR code 405 and/or the appropriate the augmented reality item data. For example, multiple records can match the query string 420 "Corvette", however, the ARILS can be configured to select the record that matches the publish date 425 of the QR code 405.

The text strings for the versioning information 410, the ARILS URL 415, and query string 420 can each include a terminating character 430 to indicate the end of a single data element. In this example, the ampersand (&) has been used as the terminating character 430. The terminating character 430 can be defined during implementation of the ARIM 400 and ARIV.

It should be noted that the information 410-425 presented in example ARIM 400 is for illustrative purposes only, and is not meant as an absolute implementation of an embodiment of the present invention.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system that provides interactive three-dimensional (3D) augmented realities comprising:
an augmented reality item marker (ARIM) coupled with an element of graphical media regarding a product item configured to encode at least one data element specific to said product item, wherein the ARIM is a two-dimensional graphic conforming to a standardized encoding specification, and, wherein the element of graphical media is presented upon a user-accessible surface;
a network-enabled mobile computing device having a camera component configured to digitally capture an image of the ARIM;
an augmented reality item lookup service (ARILS) configured to provide a data response comprising augmented reality item data to the network-enabled mobile computing device in response to a data request comprising at least the at least one data element from the ARIM and a unique identifier for the network-enabled mobile computing device; and
an augmented reality item viewer (ARIV) configured to present an interactive 3D augmented reality visualization of the product item upon the network-enabled mobile computing device utilizing the augmented reality item data provided by the ARILS, wherein a presented view of the interactive 3D augmented reality visualization automatically and dynamically changes to reflect a change in a planar positioning of the network-enabled mobile computing device.

2. The system of claim 1, wherein the augmented reality item data comprises at least one of 3D model data, a model number of the product item, manufacturer information, a Web address, a textual description, and dimensions of the product item.

3. The system of claim 2, wherein the 3D model data conforms to a COLLADA format definition.

4. The system of claim 1, wherein the ARIM is a QUICK RESPONSE (QR) matrix code.

5. The system of claim 4, wherein the at least one data element encoded within the QR matrix code comprises at least one of a version identifier, a uniform resource locator (URL) for the ARILS, a query string, and a date of publish.

6. The system of claim 1, wherein the ARIV is a FLASH-based application running on the network-enabled mobile computing device.

7. The system of claim 1, wherein the interactive 3D augmented reality visualization is rendered by the ARIV in at least one of real-time and near real-time.

8. The system of claim 1, wherein the data request and the data response between the ARILS and the ARIV conform to a standardized encoding format.

9. The system of claim 8, wherein the standardized encoding format is an extensible markup language (XML).

10. A method for providing interactive three-dimensional (3D) augmented realities comprising:
    capturing of a digital image of an augmented reality item marker (ARIM) for a product item by an augmented reality item viewer (ARIV) running on a network-enabled mobile computing device, wherein said ARIM is captured utilizing a camera component of the network-enabled mobile computing device;
    decoding at least one data element from the captured ARIM;
    requesting augmented reality item data from an augmented reality item lookup service (ARILS) that matches the at least one decoded data element; and
    in response to receiving the augmented reality item data from the ARILS, rendering an interactive 3D augmented reality visualization of the product item upon the network-enabled mobile computing device in at least one of real-time and near real-time.

11. The method of claim 10, wherein the rendering of the interactive 3D augmented reality visualization further comprises:
    calculating a device position of the network-enabled mobile computing device relative to a surface presenting the ARIM, wherein said calculation is based upon a position of the camera component when capturing the ARIM; and
    adjusting the rendered interactive 3D augmented reality visualization to match the calculated device position.

12. The method of claim 11, further comprising: identifying a change in a planar positioning of the network-enabled mobile computing device; and automatically reinitiating the calculation of the device position and the adjustment of the rendered interactive 3D augmented reality visualization.

13. The method of claim 10, wherein the ARIV is a FLASH-based application running on the network-enabled mobile computing device.

14. The method of claim 10, wherein the ARIM is a two-dimensional graphic conforming to a standardized encoding specification configured to encode at least one data element specific to the product item.

15. The method of claim 10, wherein the augmented reality item data comprises at least one of 3D model data, a model number of the product item, manufacturer information, a Web address, a textual description, and dimensions of the product item.

16. A computer program product comprising a non-transitory computer readable storage medium having computer-usable program code embodied therewith, the computer-usable program code comprising:
    computer usable program code configured to capture a digital image of an augmented reality item marker (ARIM) for a product item utilizing a camera component of a network-enabled mobile computing device;
    computer usable program code configured to decode at least one data element from the captured ARIM;
    computer usable program code configured to request augmented reality item data from an augmented reality item lookup service (ARILS) that matches the at least one decoded data element; and
    computer usable program code configured to, in response to receiving the augmented reality item data from the ARILS, render an interactive 3D augmented reality visualization of the product item upon the network-enabled mobile computing device in at least one of real-time and near real-time.

17. The computer program product of claim 16, wherein the rendering of the interactive 3D augmented reality visualization further comprises:
    computer usable program code configured to calculate a device position of the network-enabled mobile computing device relative to a surface presenting the ARIM, wherein said calculation is based upon a position of the camera component when capturing the ARIM; and
    computer usable program code configured to adjust the rendered interactive 3D augmented reality visualization to match the calculated device position.

18. The computer program product of claim 17, further comprising:
    computer usable program code configured to identify a change in a planar positioning of the network-enabled mobile computing device; and
    computer usable program code configured to automatically reinitiate the calculation of the device position and the adjustment of the rendered interactive 3D augmented reality visualization.

19. The computer program product of claim 17, wherein said computer program product is a FLASH-based application running on the network-enabled mobile computing device.

20. The computer program product of claim 17, wherein the augmented reality item data comprises at least one of 3D model data, a model number of the product item, manufacturer information, a Web address, a textual description, and dimensions of the product item.

* * * * *